United States Patent
Tai

(10) Patent No.: US 7,992,224 B2
(45) Date of Patent: Aug. 9, 2011

(54) CROWN OF WATERPROOF CAP

(76) Inventor: Tung-Hua Tai, Taipei (TW)

( * ) Notice: Subject to any disclaimer, the term of this patent is extended or adjusted under 35 U.S.C. 154(b) by 930 days.

(21) Appl. No.: 11/806,290

(22) Filed: May 31, 2007

(65) Prior Publication Data

US 2008/0295223 A1    Dec. 4, 2008

(51) Int. Cl.
*A42B 1/00* (2006.01)
(52) U.S. Cl. .......... 2/195.1; 2/209.12; 2/195.5; 2/175.4
(58) Field of Classification Search .......... 2/195.3, 2/195.1, 209.12, 183, 184, 209.13, 209.4, 2/175.2, 175.3, 175.4, 195.5, 200.1; 112/417, 112/418, 1, 41, 122.3
See application file for complete search history.

(56) References Cited

U.S. PATENT DOCUMENTS

| | | | |
|---|---|---|---|
| 3,431,561 A * | 3/1969 | Horst et al. ............. | 2/195.7 |
| 6,868,559 B1 | 3/2005 | Wong | |
| 7,174,572 B1 * | 2/2007 | Diamond et al. ............. | 2/181 |
| 7,278,173 B2 * | 10/2007 | Turner ............. | 2/209.4 |
| 2005/0223475 A1 * | 10/2005 | Turner ............. | 2/209.4 |
| 2006/0137706 A1 | 6/2006 | Harr et al. | |
| 2008/0044614 A1 * | 2/2008 | Hannon ............. | 428/57 |
| 2010/0313335 A1 * | 12/2010 | Waters ............. | 2/209.13 |

FOREIGN PATENT DOCUMENTS

TW    I272070    2/2007

* cited by examiner

Primary Examiner — Katherine Moran
Assistant Examiner — Richale Quinn

(57) ABSTRACT

The present invention is aimed to provide a crown for waterproof cap. The crown (20) consists of six panels (21~26), inside the crown there are diagonal seams (27) intersected. These seams can be sealed by stickers (41~43) contain thermoplastic membrane (40). Whereby the seams are connected with panels (21~26) to achieve waterproof effects. In manufacturing, high frequency circular wheel cuts and melts between panels (21~26), leftovers cut off and thrown out, piled sides of panels are welded to form a seam (27). Stickers contain thermoplastic membrane can be heated inside the crown between two adjacent panels, where a roller rolls over to press down the sticker to cover up the seams. Thereby, a crown is completed.

4 Claims, 14 Drawing Sheets

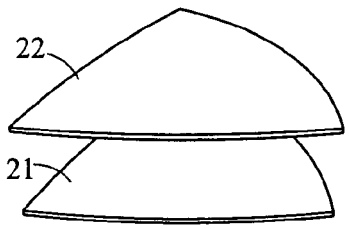
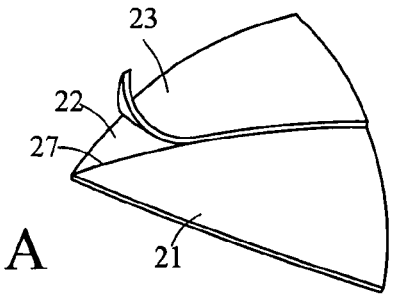
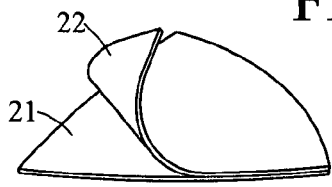
FIG.11A
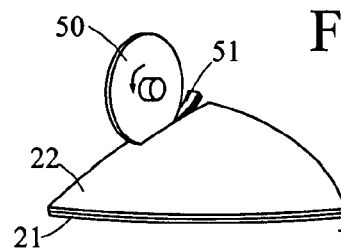
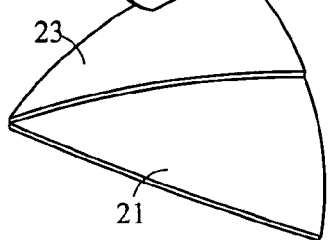
FIG.11B
FIG.11F
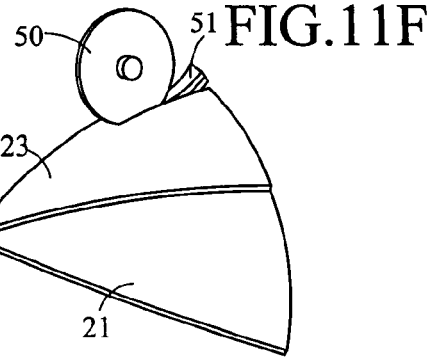
FIG.11C
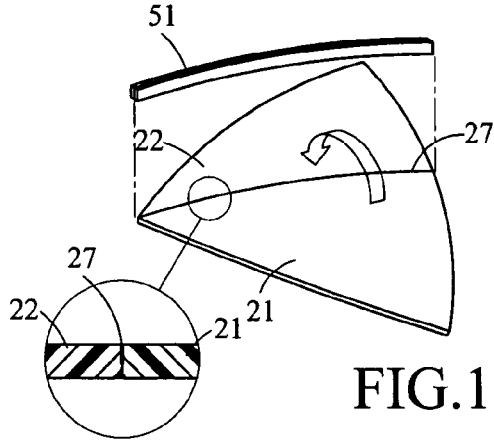
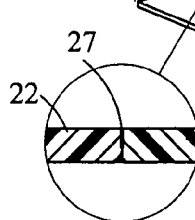
FIG.11D
FIG.11E
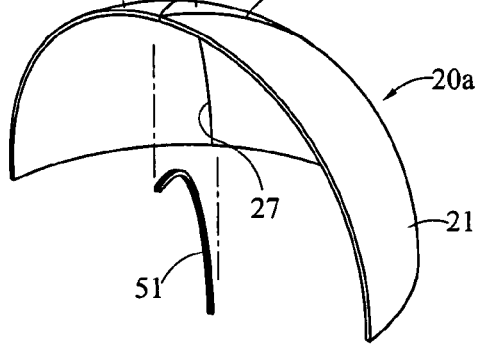
FIG.11G
FIG.11H

CROWN OF WATERPROOF CAP

FIELD OF THE INVENTION

The present invention is related to a crown of waterproof cap manufactured through simplified steps to reduce seams and stitches exposed outside; the cap used as baseball cap, golf cap, or mountain climbing cap.

DESCRIPTION OF PRIOR ARTS

Conventional caps (80) as shown in FIGS. 1 & 2 mainly includes crown (81) and a projected out bill hung over wearer's eyebrows. The crown (81) consists of six pieces of panels (811~816), which are assembled together one by one in same manners. For example, two panels. (811,812) should be first stitched up by stitches (83) as shown in FIG. 3. After stitching, two leftovers (85) are protruded out on the stitches (83). Fashion outlooking of a cap with such leftovers (85) are outspoken as "high quality and price competitive", after an extra decorative strip (86) covering up the leftovers (85) and then stitched together by two stitches (87) as shown in FIG. 4

As shown in FIGS. 1 and 2, two stitches (87) exposed out of a surface may be blemishes of the crown (81) on visual inspection. Moreover, a waterproof material (such as Gore-Tex®) is applied to make up a waterproof crown, a lot of stitch holes and seams may be undulate along those exposed out two stitches (87) according to wrinkles and folds of the cloth they bind, there is potential risk for rain or water to seep through the stitch holes and seams. A perfect impervious effect is not easy to achieve. Furthermore, those two stitches (87) are stitched together with the decorative strip (86), which is made of cloth, to provide only radial strain (i.e. front and rear tension) to the crown (81), but not axial strain (i.e. keep things up and down) thereto.

To avoid stitched holes and stitches (87) formed along both sides of seams (84) of the crown (81), simplified steps may be taken to eliminate stitches or seams.

Although it is not so easy to trace how panels can be patched together and developed into a crown, but persons skilled in the art has provided some prior arts, such as U.S. Pat. No. 6,868,559 entitled "Multi size cap" to Cham Chung Wong on Mar. 22, 2005, Wong taught that a seamless headband loop is formed by a single stitching pass to create the inward fold of the gores (i.e. panels) and attach the elastic band and headband loop to the crown portion, no transverse seams present on the headband. Such seams can cause uneven pressure and discomfort for the user in spite of seamless headband loop stitched inside the cap is not to be seen from outside. Because such a headband is usually, hidden from view, stitched inside the gores, the seamless structure is not related to a fashion outlooking of the gores when they are assembled together.

Or as U.S. Pat. No. 20060137706 entitled "convertible ponytail holder/headband" assigned to Asher Harr et al. on Jun. 29, 2006. It disclosed a strand of seamless poly-cotton or poly-nylon with sufficient elasticity . . . the tubular, seamless structure of the strand is specifically designed to increase the surface area in contact with a bead to increase friction and tension. Although seamed or stitched material may be a substitute for such a seamless structure of the strand, but a seamless structure is aimed to reduce a weight, or bulkiness of the tubular strand.

Or as TW I272070 entitled "Seamless cap" to Tai-Kwang, Wang on Feb. 1, 2007, as shown in FIG. 5, a waterproof fisherman cap (90) consists of a crown (91), a visor (92) circular in shape, and a decorative band (921), wherein the crown (91) is composed of several panels (93,94). Manufacturing methods of the fisherman cap can be shown step by step in FIGS. 6A~6E as following:

a. As shown in FIG. 6A, a waterproof cloth is selected to cut out specific shape panels (93, 94).
b. As shown in FIG. 6B, panels (93, 94) are piled to the sides stitched together by sewing machine needles (95) with stitches (96) along the piled sides.
c. As shown in FIG. 6C, the piled sides is not only stitched, but also processed through supersonic waves welding machine (97) to weld the piled sides as a whole.
d. As shown in FIG. 6D, the stitched sides are welded together as a whole with leftovers or fringes (99), which are to be cut off in part by a trimmer (such as scissor, trimming cutter) whereby only a hem seal (100) is left.
e. As shown in FIG. 6E, a decorative strip (101) contains melted together textured plastic membrane is heated to seal and cover up the hem seal (100) to form a crown (91) of the waterproof fisherman cap (90).

The decorative strip (101) added to an outer surface of the crown (91) of waterproof fisherman cap, the decorative strip (101) is therefore exposed outside the crown (91). Wearers could observe clearly the surface of the crown (91) inset with such decorative strip. Being incorporated to a high-grade cap, this decorative strip may show off by demonstrating stripes or the like over the crown, however, an undulate or wave motion fashion outlooking of the crown may further cause rain, water seeping through this unevenly inset decorative strips.

As shown in FIG. 7, a cross sectional view taken along line 7-7 of FIG. 6E is illustrated. After stitching together, a leftover (99) is trimmed to the line with a trimmer to show an exact size, where the hem seal (100) left is still a little protruded out from the spread out panels (93, 94). Therefore, after attaching the decorative strip (101) to cover up the hem seal (100), there still has some projectures jutting out from the hem seal (100). It may cause either uncomfortable tactile feeling when touched by a wearer's fingertips, or an aesthetical perspective of each of them is incomplete due to seams undulate according to wrinkles and folds of the cloth they bind.

In manufacturing, as shown through FIGS. 6B~6D, the panels (93,94) piled to the sides, which is first stitched together by sewing machine needle (95) with stitches (96); and then the stitched piled sides are welded together by super sonic waves welding machine (97); finally, cut off leftovers (99) from the welded, stitched, and piled sides by trimmers (98). Processed through stitching, welding and trimming, labor cost is incurred; further acquisition time is delayed due to step by step manufacturing is more time-consumption.

Rather, the panels (93, 94) piled to the sides, which are stitched together, where the stitches (96) are exposed outward, the stitches outstands from the surface of panels (93, 94). Welding process follows on such stitched together undulate surface may cause a decorative strip later added to the surface to form an uneven surface. The fashion outlooking of the crown is therefore affected by the uneven surface.

While the hem seal (100) is attached with a decorative strip (101) contains melt together textured plastic membrane, such as thermoplastic polyurethane (TPU), can be used to cover up the hem seal (100) further coupled with the panels (93, 94). The hem seal (100) connected a first panel (93) with a second panel (94), both panels and hem seal will be wrinkled as "expand when hot and shrink when cold" phenomena happened to them. Melt temperature of TPU is, at least, in the range of 85~110° C. Whenever the panels (93,94) are treated through high temperature, the wrinkles will be wrinkled finished thereon. Since the decorative strip (100) covers up the hem seal (100) from outside evenly, therefore, the decorative strip (101) are laying on the wrinkled finished panels and hem seal as a whole, even the decorative strip is sealed to the hem seal (100), the wrinkled surface of panels still looks like wave motion.

TPU though imparts more or less elasticity, which is inferior to a soft rubber. Whenever TPU is applied to a crown, only a limited elasticity generated in an axial or a radial orientation can be expected. To fit different size heads of wearers snugly, the crown (91) must be increased with its elasticity on both axial and radial orientations. An increased elasticity is required to provide to the crown, and a hardness of the crown must be reduced relatively.

SUMMARY OF THE INVENTION

The present invention is to provide a crown for waterproof cap manufactured; both stitches and decorative strips are not readily to be seen as parts of a fashion outlooking of the crown, only seams can be perceived from outside. The crown not only looks neat and smooth, but also being provided with a preferrable axial and radial elasticity. Either a stylish, fashionable cap can be presented or a tactile feeling of the cap can be one's liking.

The crown of waterproof cap further can be processed through manufacturing methods reduced to simple steps instead of the conventional methods divided into three steps—such as stitching, melting, and trimming—to facilitate manufacturing the waterproof cap at a reasonable labor cost, material cost and is only required by using a new process to save time in consideration of an economic rationality.

A crown for waterproof cap, the crown (20) consists of six synthetic fiber panels (21~26) characterized in that each of the panels (21~26) are piled to sides to an adjacent panel, piled sides can be welded together, after welding, three diagonal seams (27) are readily formed between the six panels (21~26), the three diagonal seams (27) intersected at an apex, thermoplastic membrane stickers (41~43) are adhesive inside the panels (21~26) to cover up the seams (27), whereby the panels (21~26) can be assembled together to provide a waterproof cap whose crown (20) is endowed with an elasticity both in an axial orientation (10a) and a radial orientation (10b).

A crown for a waterproof cap manufactured as mentioned above, characterized in that a trademark logo (80) is stitched to an outer surface of the crown (20), a sticker (47) contains melt together textured plastic membrane (40) is heated to seal an inner surface where the logo (80) is stitched on the outer surface opposite to the sticker (47).

A crown for a waterproof cap as mentioned above, characterized in that the sticker (47) is selected from strips made of synthetic fibers or cloth; a plurality of layers of thermoplastic polyurethane (TPU) and thermoplastic rubber (TPR) are combined to form the thermoplastic membrane, which is used to spread on a single surface of the sticker (47).

A crown for waterproof cap manufactured as mentioned above, characterized in that six panels (21~26) can be assembled together to form a crown by steps: (a) cut out the six panels (21~26) made of synthetic fibers, each panel has an over all triangular shape with both left and right sides are slightly arched with a flat bottom side in between; (b) two adjacent panels can be piled to the sides, which are welded together by a high frequency plastic welding machine further equipped with a circular cutter (50) to cut off leftovers (51) immediately, after cutting, left piled sides melt together to form a seam (27); as the six panels (21~26) are assembled together to form a crown (20), three diagonal seams (27) formed on an inner surface of the crown; (c) stickers (41~43) contain thermoplastic membrane (40), which is heated by hot air to melt together to the stickers (41~43), and then the stickers (41~43) are pressed along the diagonal seams (27) inside the crown (20); each of the stickers (41~43) are added to cover up each seam between two adjacent panels to seal the seams (27), thus the waterproof crown (20) is shaped.

A crown for waterproof cap as mentioned above, characterized in that of step (b) a circular cutter of high frequency plastic welding machine is applied to trim and weld the piled sides of adjacent panels, a roller (54) of high frequency welding machine is further applied to level and smooth the seams (27).

A crown for waterproof cap as mentioned above, characterized in that after step (c), the three seams (27) intersected at an apex, which is also an intersect point of, at least, the three diagonal stickers, a male buckle fit through the apex from inside the crown, a female buckle outside the apex coupled with the male buckle as a waterproof coupling.

A crown for waterproof cap as mentioned above, characterized in that after step (c), the outer surface of the crown (20) is embroidered with a logo (80), a sticker (47) contains thermoplastic membrane (40), which is heated to melt, a press roller (52) is applied to level and smooth the sticker (47) inside the crown (20) in position where is embroidered with the logo (80) on the outer surface of the crown (20) opposite to the sticker (47).

BRIEF DESCRIPTION OF THE DRAWINGS

FIGS. 11A~11L: show diagrammatic views of a first manufacturing process of the cap of FIG. 8;

DETAILED DESCRIPTION OF THE PREFERRED EMBODIMENTS OF THE INVENTION

The description is described in detail according to the appended drawings hereinafter.

Figure 1:
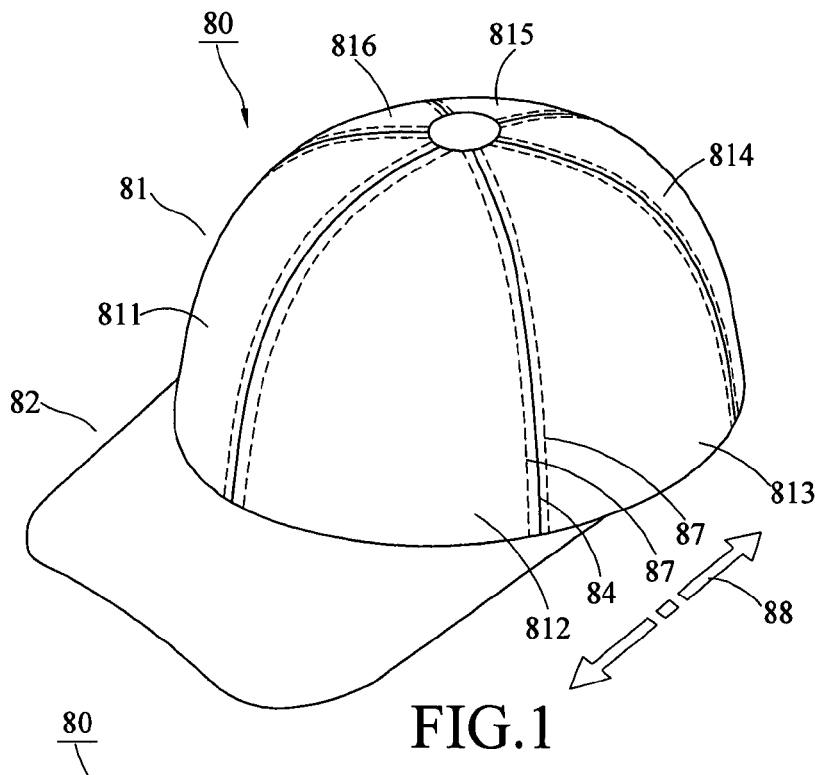
FIG. 1: shows a plan view of a conventional cap.
Figure 2:
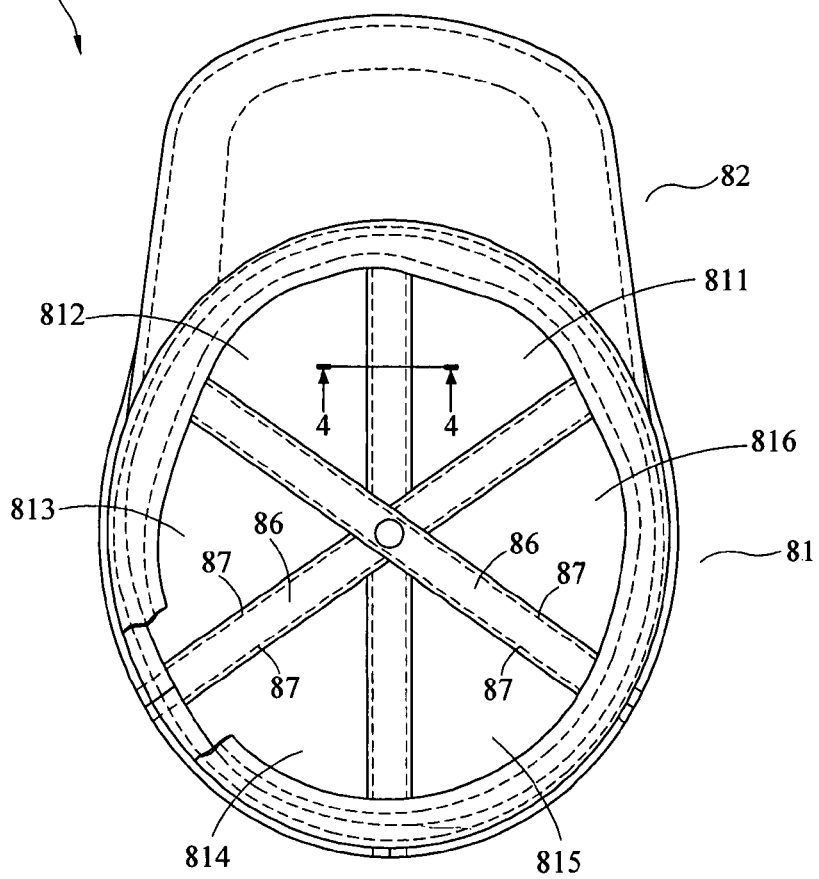
FIG. 2: shows a bottom view of a conventional cap.
Figure 3:
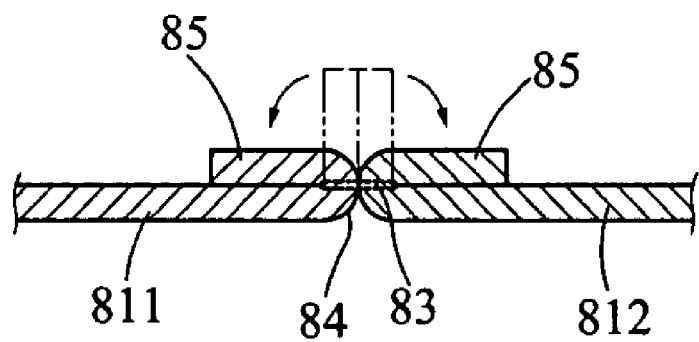
FIG. 3: shows a sectional view of a seam stitched between two adjacent panels of FIG. 2.
Figure 4:
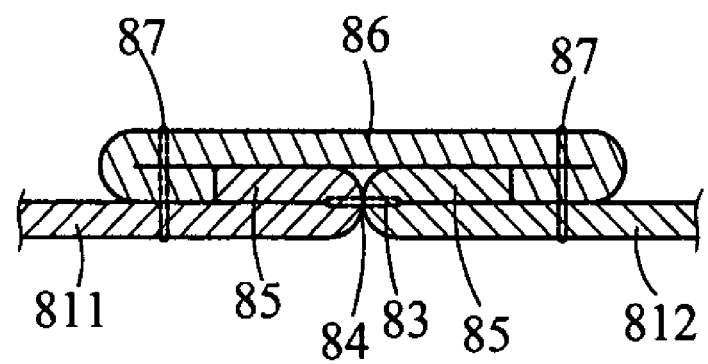
FIG. 4: shows a cross sectional view taken along line 4-4 of FIG. 2.
Figure 5:
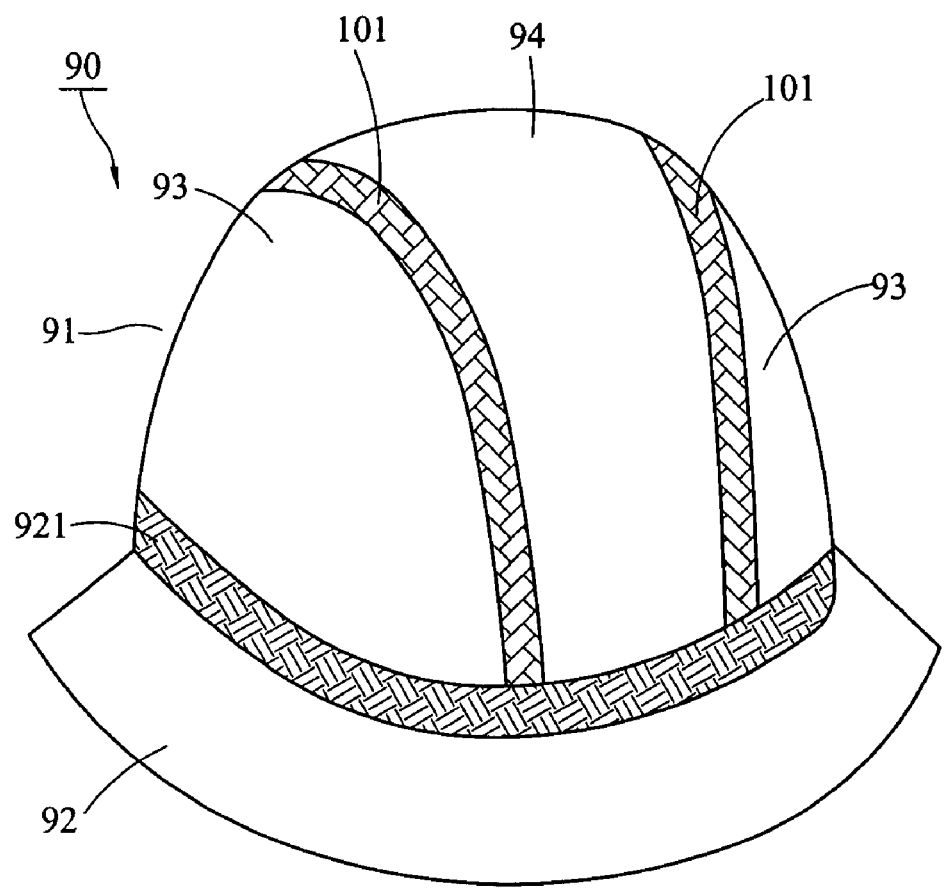
FIG. 5: shows a perspective view of a conventional fisherman cap of TW I272070.
Figure 6A:
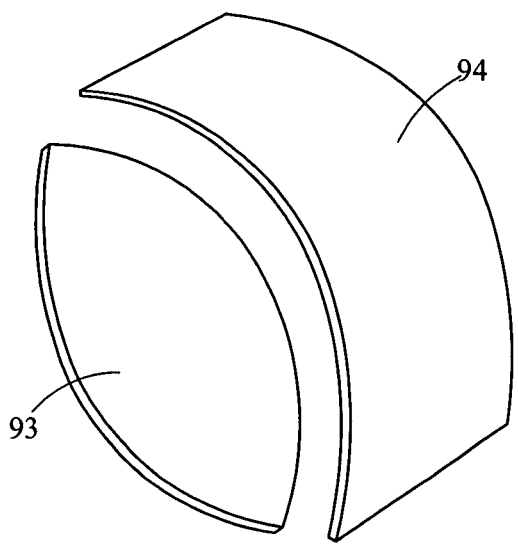
FIGS. 6A~6E: show diagrammatic views of manufacturing process of the conventional fisherman cap of FIG. 5.
Figure 6B:
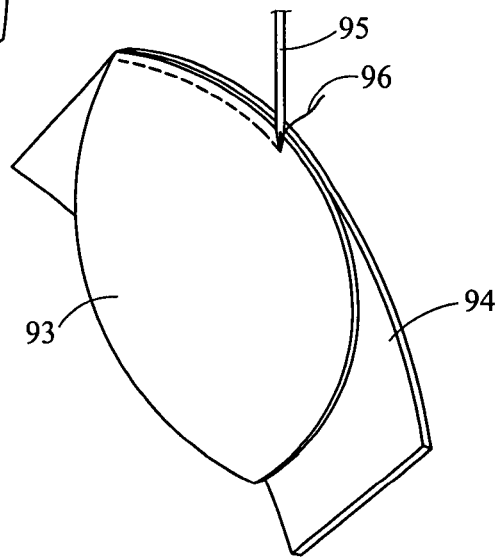
Figure 6C:
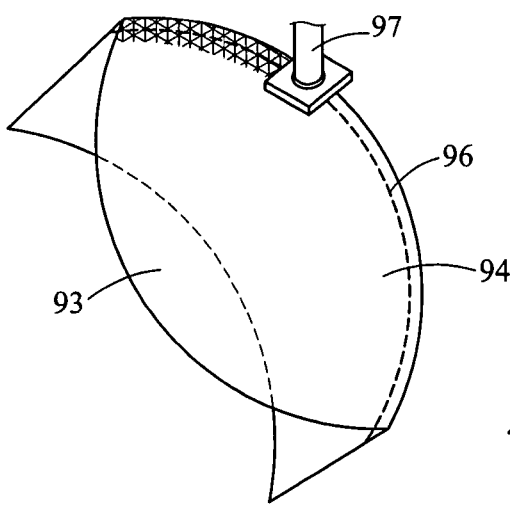
Figure 6D:
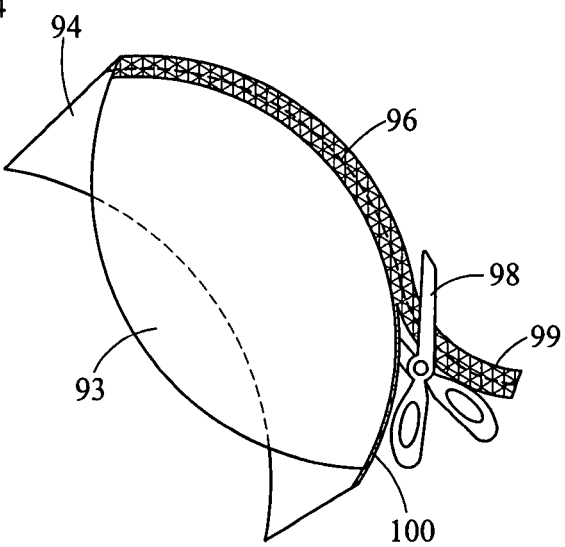
Figure 6E:
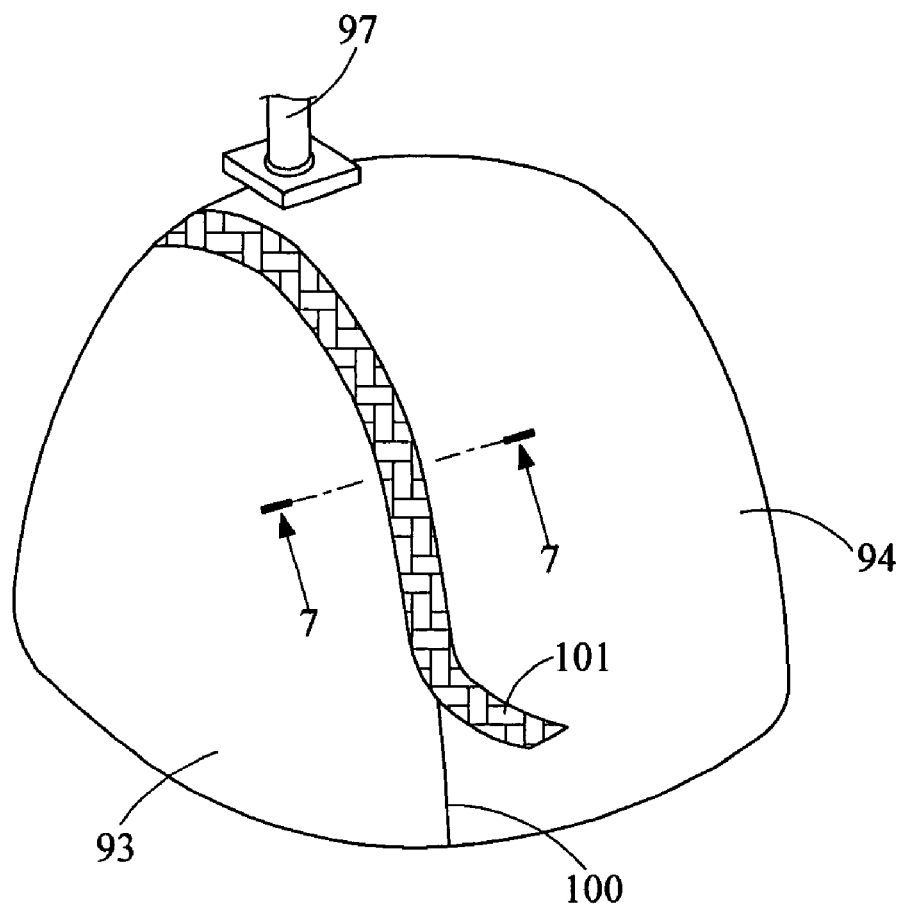
Figure 7:
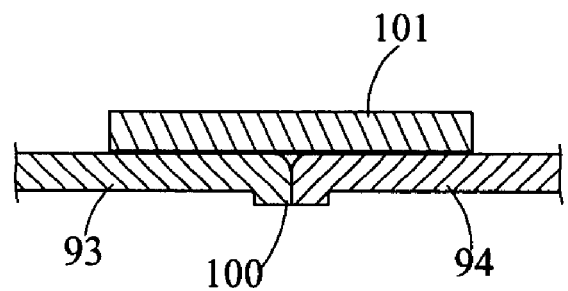
FIG. 7: shows a cross sectional view a decorative strip covering up a seam taken along line 7-7 of FIG. 6E.
Figure 8:
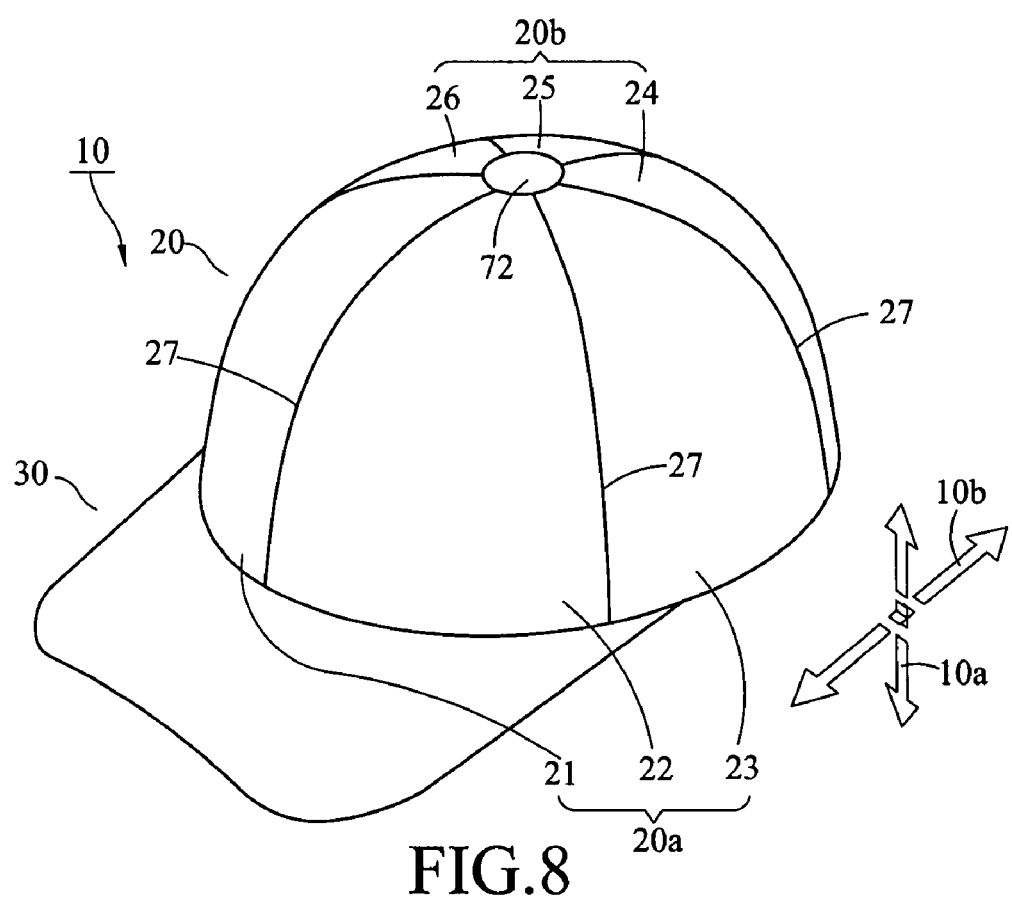
FIG. 8: shows a plan view of a cap of the invention.
Figure 9:
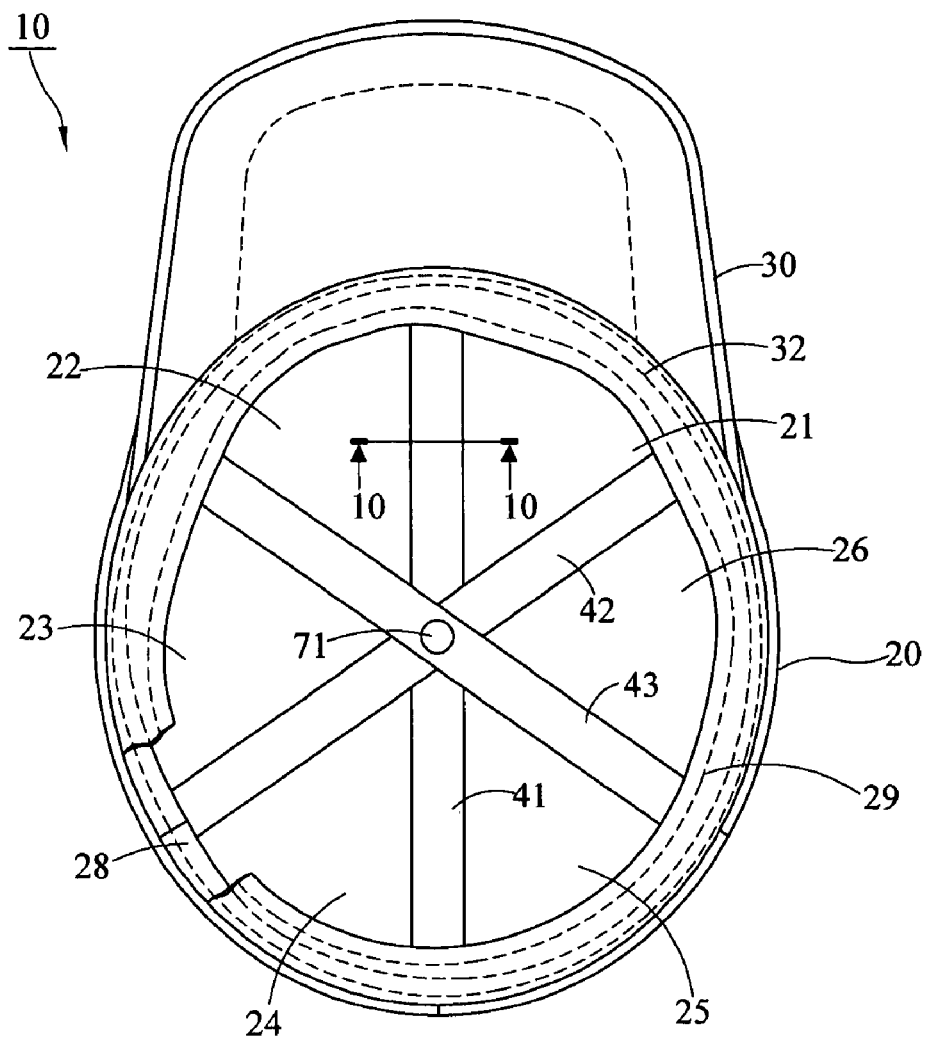
FIG. 9: shows a bottom view of FIG. 8.
Figure 10:
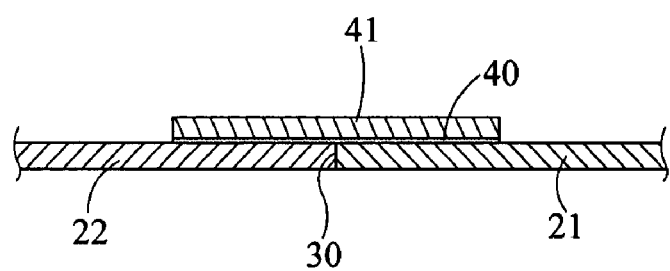
FIG. 10: shows a cross sectional view taken along line 10-10 of FIG. 9.

FIGS. 8, 9 show a plan view and a bottom view of a waterproof cap of the invention, FIG. 10 shows a cross sectional view taken along line 10-10 of FIG. 9.

Waterproof cap (10) is composed of a crown (20) and a visor (30) projected out hung over wearer's eyebrows. The crown (20) consists of six panels (21~26) made of synthetic fibers.

Each of the panels (21~26) shaped as an over all triangular shape with both two left and right sides slightly arched and a flat bottom side in between. Each two adjacent panels are piled to the arched sides, after welding, said six panels processed through heated and sealed process to finish seams (27) likely three diagonal lines intersect one another at an apex. Stickers (41~43) contain thermoplastic membrane (40) applied to an inner surface of the six panels (21~26) to cover up the seams (27).

Panels (21~26) are made from materials containing an amount of synthetic fibers no less than 50%, and more synthetic fibers are preferable for a later trimming, welding process by a circular cutter (50) of a high frequency welding machine.

Because the stickers (41~43) are heated and sealed to the inner surface of each panel (21~26) respectively, so the stickers (41~43) are hidden from view inside the crown (20). Wearers could perceive only six seams (27) converged into an apex of the crown, but no stitches, stickers to be seen. Further, the stickers (41~43) contain thermoplastic membrane (40) is composed of multiple layers of thermoplastic polyurethane (TPU) and thermoplastic rubber (TPR). Due to the crown (20) is elasticated with the synthetic fibers, the elasticity would be sufficient to stretch out the crown in either an axial orientation (10a) (i.e. keep things up and down) or a radial orientation (10b) (i.e. front and rear tension).

Stickers (41~43) are selected from strips made of synthetic fibers (such as synthetic resin, nylon) or clothes (such as cotton cloth), nylon material is more applicable than others. While the thermoplastic membrane (40) is spreadable to a single surface of the stickers (41~43), such as melting temperature of TPU is in the range of 85~110° C., melting temperature of TPR is in the range of 70-90° C. After a multiple layers of TPU, TPR are combined to form the thermoplastic membrane (40), whose elasticity is increased, but hardness is reduced. As TPU, TPR are combined as a whole, melting temperature of them is restricted to a common range of 85-90° C. When the thermoplastic membrane (40) is finished and thermally sealed to the six panels (21~26) at a required temperature about 85-90° C., those panels (21~26) connected with six seams (27) will not generate wrinkles. In other words, under such circumstance, a thermoplastic (composite) membrane (40) will not heat up the panels with shrinkages.

Six panels can be assembled together to form a crown of waterproof cap as shown in FIGS. 11A~11L and 12A~12F, steps (a), (b), and (c) can be described as following:

(a) As shown in FIG. 11A, cut out six panels (21~26) made of synthetic fibers, panels (21~26) has an over all triangular shape with both left and right sides slightly arched and a flat bottom side in between. Strictly speaking, six panels can be classified into three pairs of panels; each pair of panels has different areas and both sides slightly arched. Six panels are thus divided into a pair of front panels (21,22), a pair of rear panels (24,25), and a pair of side panels (23,26). Pairs of the front and rear panels are a little elongated than the pair of side panels (23,26). After assemblage, a bottom perimeter of the crown is formed in an elliptic shape.

(b) As shown in FIG. 11B, the pair of front panels (21,22) are piled to two adjacent sides slightly arched, for example, a first side of the panel (22) is piled with a second side of the panel (21). As shown in FIG. 11C, a circular cutter (50) of a high frequency welding machine can be applied to trim and melt the piled sides. As shown in FIG. 11D, leftovers (51) is cut off, where left piled sides are welded to form a seam or hem seal (27). As shown in FIG. 11E, the two panels (21,22) have a thickness in the range of 0.1~0.5 mm. Due to the thickness is rather thinner than the piled sides, when the circular cutter (50) is applied to thermally cut off the leftovers (51) of panels (21,22), at least, a half of the piled sides is also heating and welded together to form a seam (27) connected with two adjacent panels (21,22).

As shown in FIG. 11F, a second side of the panel (22) is piled with a first side of the panel (23). As shown in FIG. 11G, the circular cutter (50) of the high frequency welding machine trims and welds along the piled sides. Leftovers (51) are immediately thrown out once it is cutting off from the piled sides, which are welded together to form a seam connected with both panels (22,23). At this time, when spreading up the seams (27) connected with panels (21~23), one half crown (20a) is formed in the form of one half dome with one half circular perimeter, which is shown in FIG. 11H.

Figure 11I:
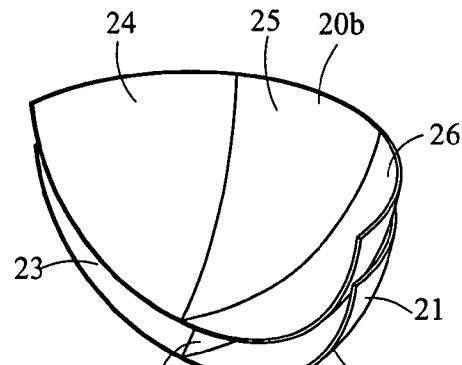
Figure 11J:
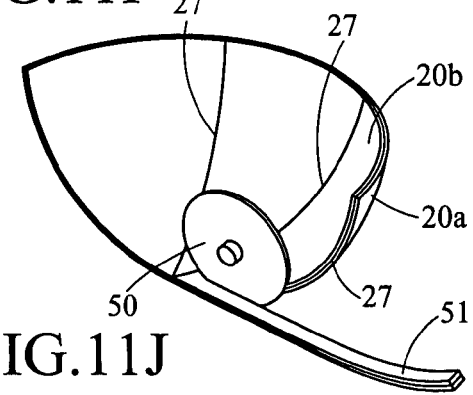
Figure 11K:
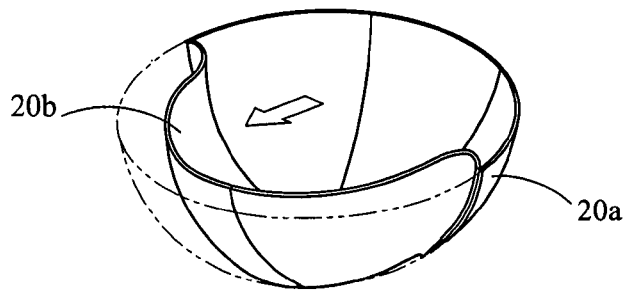
Figure 11L:
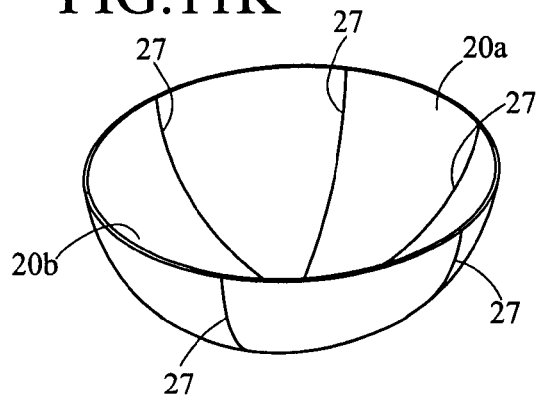

Three panels (24~26) can be used to form the other half crown (20b) in the form of half dome with half circular perimeter as shown in FIG. 11I. Both half domes of the half crowns (20a, 20b) are piled to the sides, and as shown in FIG. 11J, the circular cutter (50) trims and welds along the piled sides. Leftovers (51) are immediately thrown out once it is cutting off to the line to show an exact size, while the piled sides are welded together to form a diagonal seams (27) connected with both half domes (20a, 20b). As shown in FIG. 11K, to spread out six panels (21~26), a crown (20) shaped in the form of a complete dome with three diagonal seams hidden inside the dome, each diagonal seam is intersect with another two diagonal seams at the apex of the dome.

Figure 12A:
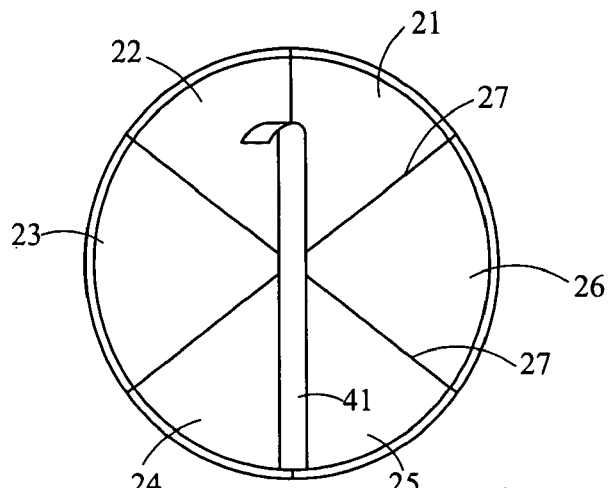
FIGS. 12A~12F: show diagrammatic views of a second manufacturing process of the cap of FIG. 8.
Figure 12B:
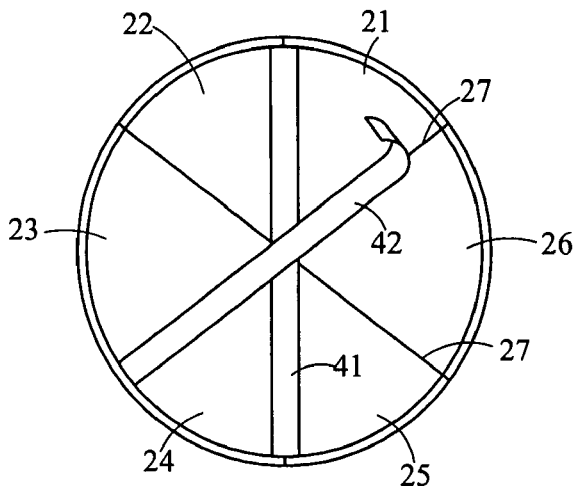
Figure 12C:
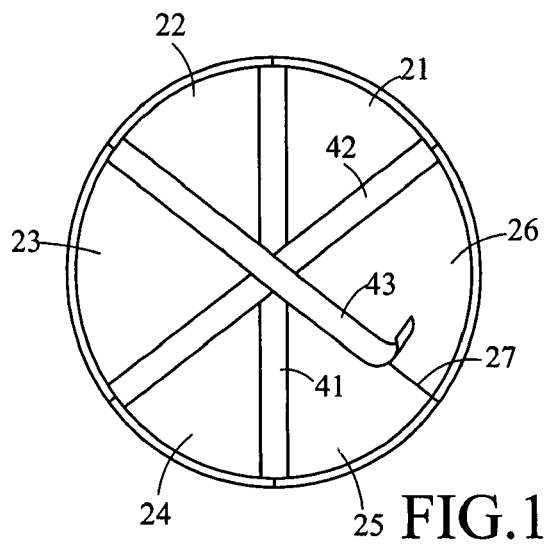
Figure 13:
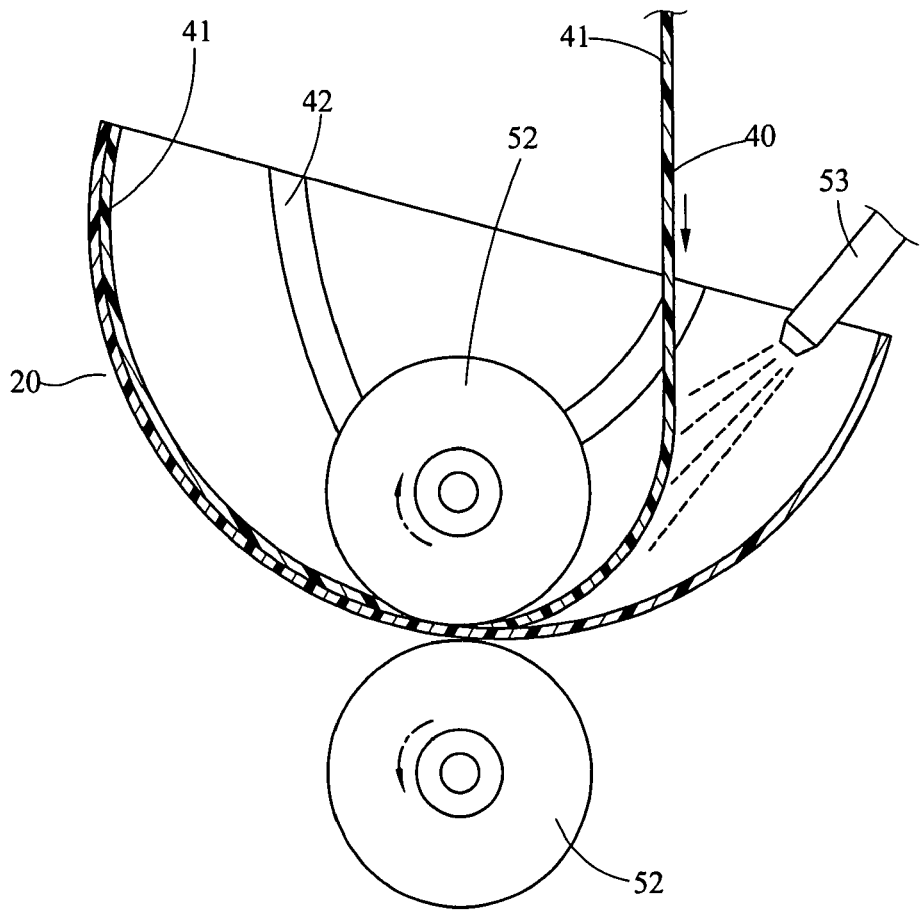
FIG. 13: shows a diagrammatic view of a sticker seals a seam by welding.

(c) As shown in FIG. 12A, a sticker (41) contains a thermoplastic membrane (40), when heating, the thermoplastic membrane (40) is melt together to the sticker (41). As shown in FIG. 13, a hot air pipe (53) thermally flows a blast of hot air to the sticker (41), where the thermoplastic membrane (40) heated and sealed to a surface of the sticker (41) is melt at a temperature in the range of 85~90° C., and then, a roller (52) rolls over and presses down the sticker (41) to cover up one diagonal seams (27) inside the crown (20). As shown in FIGS. 12B, 12C, accordingly, the other two stickers (42,43) are pressed by the roller (52) to cover up the other two diagonal seams (27). Thus a crown (20) of a waterproof cap is formed.

Figure 12D:
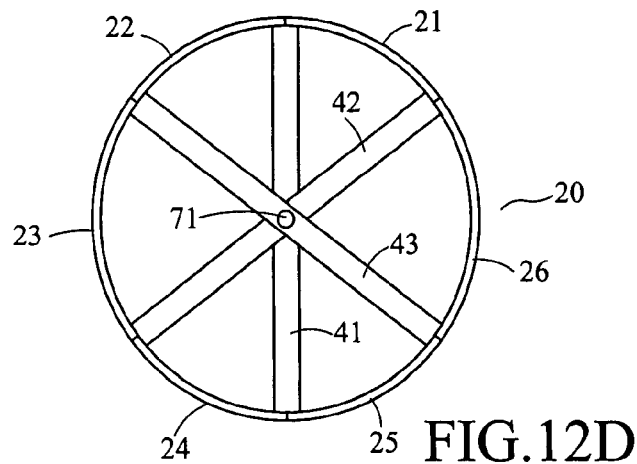

As shown in FIG. 12D, three stickers (41~43) are intersected with one another at an apex inside the crown, where the intersection point is provided with a male buckle (71) to match a female buckle (72) added to the apex outside the crown. Further, waterproof washer or other waterproof films can be added between the male and female buckles.

Figure 12E:
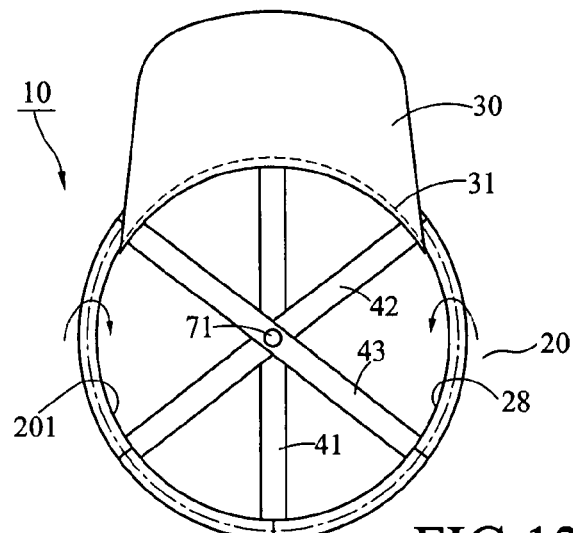

As shown in FIG. 12E, a perimeter of the crown (20) can be folded inward at 180° to form a reverse side (28), and then stitched to a projected out visor (30) by stitches (31), thereby the visor (30) is integrated with the crown (20) as a whole.

Figure 12F:
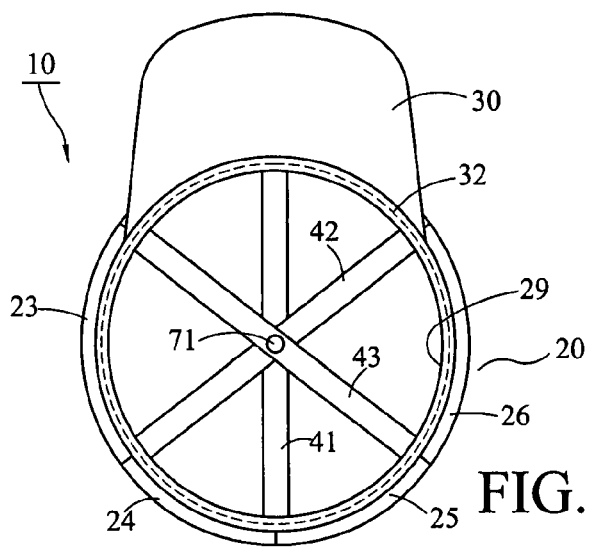

As shown in FIG. 12F, inside the crown (20), the reverse side (28) is coupled with a ring type sweatband (29). The reverse side (28), the visor (30), and the ring type sweatband (29) can be sewn together by stitches (32). Because the stitches (31,32) are stitched along the reverse side (28), which is hidden inside the crown (20), where onlookers could not perceive the reverse side (28) and the stitches (31,32).

Figure 17A:
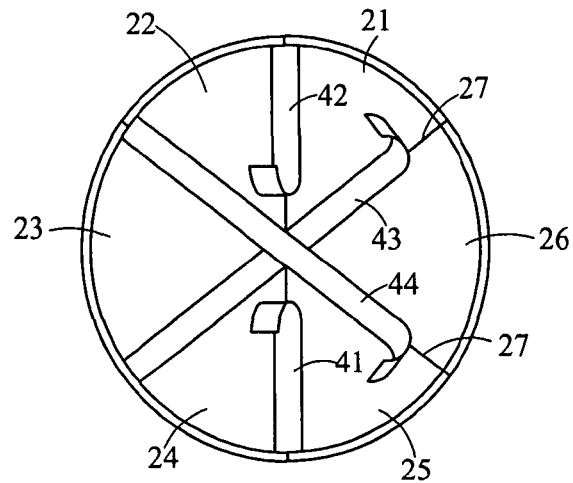
FIGS. 17A~17C: show three different embodiments of the stickers seal the inner sides of the crown.
Figure 17B:
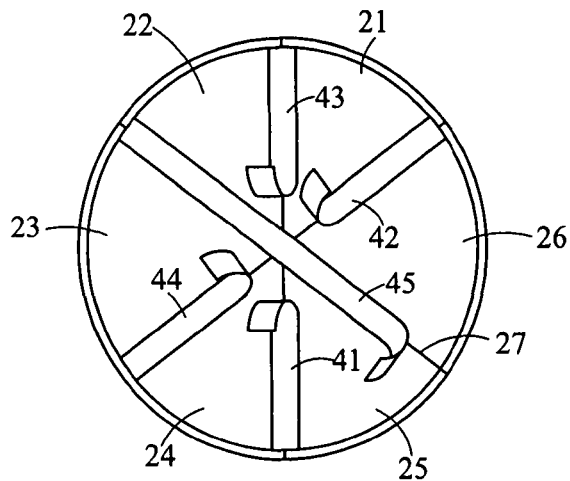
Figure 17C:
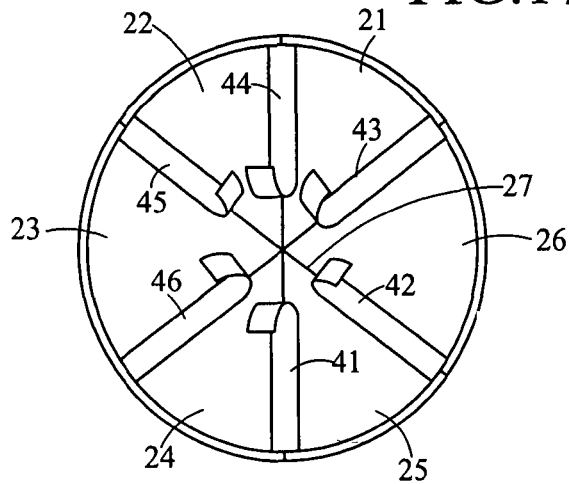

Other than a preferrable embodiment depicted in FIGS. 12A~12F, alternate embodiments still can be realized such as the circular cutter (50) of the high frequency welding machine trims and welds between two panels (21,22), where is heated further provided with a sticker (not shown) to cover up a seam (27) in between. In turn, seams (27) can be formed one by one between six panels. Finally, three diagonal seams (27) are intersected at an apex inside the crown, and being connected with the six panels (21~26). Three stickers (41) welded to cover up the three diagonal seams (27) respectively as shown in FIG. 17C. As shown in FIG. 11F, a second side of the panel (22) is piled with a first side of the panel (23), two seams (27) among the three panels (21~23) can be sealed by stickers (41,42) (not shown). Two half domes (20a, 20b) can be combined to form a crown (20) wherein either as shown in FIG. 17B, a longer sticker (45) covers up a diagonal seams or as shown in FIG. 17C, two sticker (45,46) cover up the seams (27).

Figure 14:
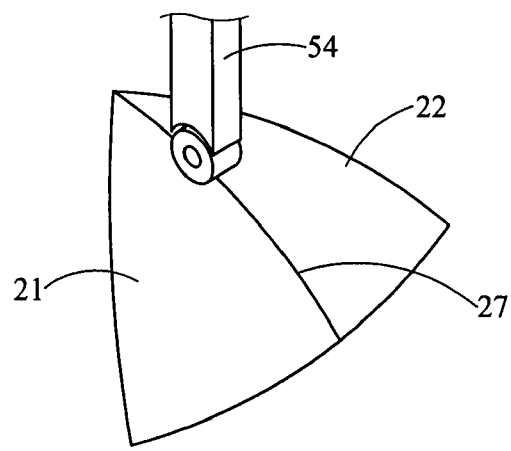
FIG. 14: shows a diagrammatic view of a roller rolls over to press down the seam.

As shown in FIG. 14, a crown of waterproof cap can be processed through circular cutter of the high frequency welding machine as step (b) disclosed, the circular cutter can trim and weld the piled sides of two adjacent panels, and then a roller of the high frequency welding machine is used to level and smooth the seams (27).

Figure 15:
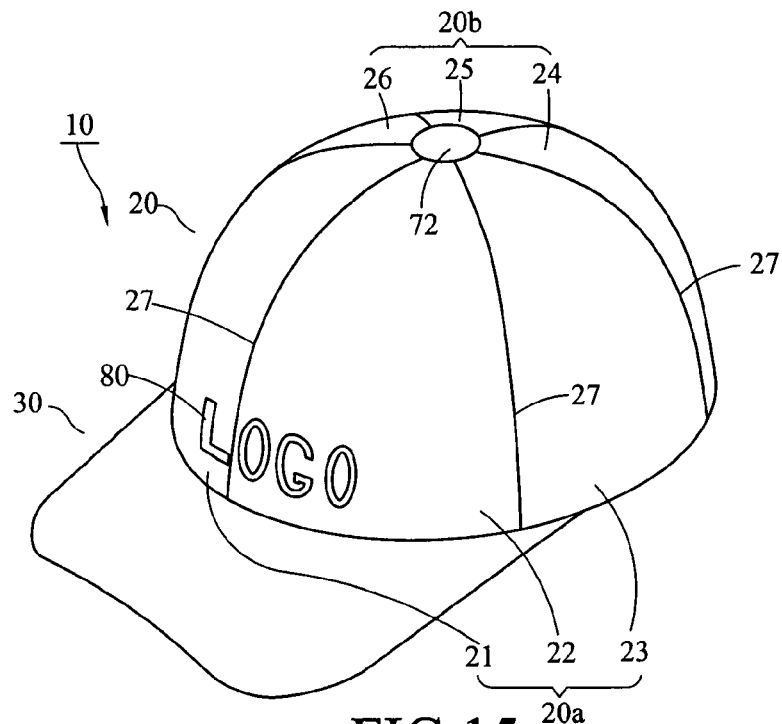
FIG. 15: shows a plan view of a cap embroidered with a logo.
Figure 16:
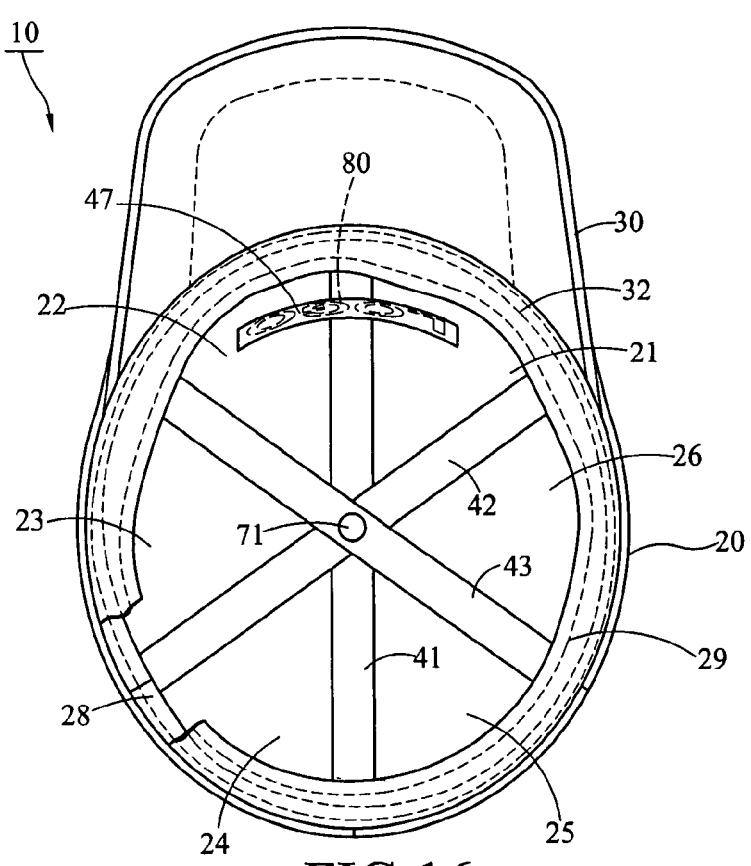
FIG. 16: shows a bottom view of a cap of FIG. 15.

As shown in FIG. 15, the cap is embroidered with a logo. As shown in FIG. 16, a bottom view of FIG. 15 is illustrated. An outer surface of the waterproof cap (10) is imprinted with a logo or embroidered with a logo (80). A plurality of stitched holes may be formed along the stitches, which is used to draw lines passed through the panel. To avoid rain, water from seeping through the stitched holes, the sticker (47) is heating and then is sealed inside the crown opposite to the logo to cover up the stitched holes.

As shown in FIG. 12C, three diagonal seams (27) are covered up by three stickers (41~43) have lengths identical to them. Further, as shown in FIGS. 17A~17C, four stickers (41~44) are applied to cover up the seams (27), where two stickers (43,44) have equal length, which are longer than the other equal length stickers (41,42). As shown in FIG. 17B, five stickers (41~45) cover up the seams, one longest sticker (45) is longer than the other four stickers (41~44). As shown in FIG. 17C, six stickers (41~46) are required, all of them are in the same length to cover up the three diagonal seams.

ADVANTAGES OF EMBODIMENTS OF THE INVENTION

A crown (20) for waterproof cap of the invention, only seams (27) can be observed from outside, while a decorative strip is provided to the conventional fisherman cap to cover up the seams.

Stickers (41~43) of the invention contains multiple layers of thermoplastic polyurethane (TPU) and thermoplastic rubber (TPR), whose elasticity is improved but a hardness is reduced, a melting temperature is relatively lowered, when the stickers (43) are combined to the crown (20), both two panels connected with the seam (27) are wrinkle resistant.

An elasticity of the thermoplastic membrane (40) of the invention is improved to an extent, that the elasticity is increased both in an axial orientation and a radial orientation to fit different sizes of heads of wearers snugly.

After an outer surface of the crown is embroidered with a logo (80), an inner surface of the crown (20) opposite to the logo (80) is sealed by the sticker (47), which is heated by welding, stitches holes can be covered up by the sticker (47).

In manufacturing conventional fisherman caps, two adjacent panels piled to the sides must be processed through such as sewing, welding and trimming three steps, while a circular cutter of high frequency welding machine of the invention can be applied to trim and weld once for all.

Further, in the invention, a roller of high frequency welding machine can be applied to level and smooth the seams (27).

At an apex of the crown, the invention is to provide a female buckle outside the apex, and a male buckle is provided inside the apex to couple with the female buckle. Not only an adornment is added to the apex, but also a waterproof function is provided.

An outer surface of the seamless crown (20) is embroidered with a logo (80), a sticker (47) seals the inner surface of the crown (20) by welding to cover up the stitches can avoid rain or water from seeping through the stitches.

What is claimed is:

1. A method for manufacturing said crown for waterproof cap includes following step:
   (a) cut out the six panels (21~26) made of synthetic fibers, each panel has an overall triangular shape with both left and right sides are slightly arched with a flat bottom side in between;
   (b) two adjacent panels piled to the sides, which are welded together by a high frequency plastic welding machine further equipped with a circular cutter (50) to cut off leftovers (51) immediately, after cutting, left piled sides melt together to form a seam (27); as the six panels (21~26) are assembled together to form a crown (20), three diagonal seams (27) formed on an inner surface of the crown;
   (c) stickers (41~43) contain thermoplastic membrane (40), which is heated by hot air to melt together to the stickers (41~43), and then the stickers (41~43) are pressed along the diagonal seams (27) inside the crown (20); each of the stickers (41~43) are added to cover up each seam between two adjacent panels to seal the seams (27), thus the waterproof crown (20) is shaped with reduced seams and stitches.

2. A method for manufacturing said crown for waterproof cap includes following step according to claim 1 wherein of step (b) a circular cutter of high frequency plastic welding machine trims and welds the piled sides of adjacent panels, a roller (54) of high frequency welding machine levels and smoothes the seams (27).

3. A method for manufacturing said crown for waterproof cap includes following step according to claim 1 wherein after step (c), the three seams (27) intersected at an apex, which is also an intersect point of, at least, the three diagonal stickers, a male buckle fit through the apex from inside the crown, a female buckle outside the apex coupled with the male buckle as a waterproof coupling.

4. A method for manufacturing said crown for waterproof cap includes following step according to claim 1 after step (c), the outer surface of the crown (20) is embroidered with a logo (80), a sticker (47) contains thermoplastic membrane (40), which is heated to melt, a press roller (52) is applied to level and smooth the sticker (47) inside the crown (20) in position where is embroidered with the logo (80) on the outer surface of the crown (20) opposite to the sticker (47).

* * * * *